United States Patent [19]
Cobb, Jr.

[11] Patent Number: 5,700,116
[45] Date of Patent: *Dec. 23, 1997

[54] TUNED DAMPING SYSTEM FOR SUPPRESSING VIBRATIONS DURING MACHINING

[75] Inventor: William T. Cobb, Jr., St. Petersburg, Fla.

[73] Assignee: Design & Manufacturing Solutions, Inc., Lutz, Fla.

[*] Notice: The term of this patent shall not extend beyond the expiration date of Pat. No. 5,518,347.

[21] Appl. No.: 609,858

[22] Filed: Mar. 1, 1996

Related U.S. Application Data

[63] Continuation of Ser. No. 447,939, May 23, 1995, Pat. No. 5,518,347.

[51] Int. Cl.$^6$ .............. B23Q 17/12; F16F 7/108; G01M 7/02; B23B 25/06
[52] U.S. Cl. .............. 409/141; 73/11.04; 73/12.09; 73/5.79; 188/379; 408/16; 408/143
[58] Field of Search .............. 408/16, 143; 409/141, 409/232, 234; 188/378, 379, 380; 73/1 DV, 11.01, 11.04, 12.01, 12.09, 5.79

[56] References Cited

U.S. PATENT DOCUMENTS

| | | | |
|---|---|---|---|
| 2,656,742 | 10/1953 | Poole | 408/143 |
| 3,447,402 | 6/1969 | Ray | 408/143 |
| 3,774,730 | 11/1973 | Maddux | 188/1 B |
| 3,838,936 | 10/1974 | Andreassen et al. | 408/143 |
| 4,534,206 | 8/1985 | Kiso et al. | 73/12.09 |
| 4,553,884 | 11/1985 | Fitzgerald et al. | 408/143 |
| 4,759,243 | 7/1988 | Thompson | 82/1 C |
| 4,799,375 | 1/1989 | Lally | 73/12.09 |
| 5,144,838 | 9/1992 | Tsuboi | 73/579 |
| 5,170,103 | 12/1992 | Rouch et al. | 318/128 |
| 5,240,358 | 8/1993 | Hackett et al. | 409/141 |
| 5,291,975 | 3/1994 | Johnson et al. | 188/378 |
| 5,388,056 | 2/1995 | Horiuchi et al. | 364/508 |
| 5,518,349 | 5/1996 | Cobb, Jr. | 408/16 |

*Primary Examiner*—Steven C. Bishop
*Attorney, Agent, or Firm*—Laff, Whitesel, Conte & Saret, Ltd.

[57] ABSTRACT

Disclosed is a tunable damping system for use in reducing vibrations associated with metal cutting and tooling. The tunable damping system may be located in a boring bar, an end mill, a modular tool section or the spindle/tool holder of the metal cutting machine. The tunable damping system incorporates a damper mass, elastomeric supports, and a means to lock the mass so as to determine tuning parameters. A tuner assembly consists of sensors and a microprocessor capable of recognizing the most dynamically flexible mode of vibration. The tuner assembly is also capable, through signal processing and microprocessor controlled algorithms, to direct the operator in implementing the proper tuning adjustments of the tunable damping system.

20 Claims, 6 Drawing Sheets

TUNED DAMPING SYSTEM FOR SUPPRESSING VIBRATIONS DURING MACHINING

This application is a continuation of prior application Ser. No. 08/447,939, filed May 23, 1995, now U.S. Pat. No. 5,518,344.

BACKGROUND OF THE INVENTION

1. Field of the Invention

This invention relates to a damping system for the suppression of vibrations created in machining processes and, more particularly, to a damping system for suppressing the free vibration and process instability associated with the use of various boring and cutting tools utilized in the machining arts.

2. Description of the Background Art

Many types of damping systems exist in the machining arts today for suppressing vibrations associated with metal cutting. Metal cutting tools and machining systems commonly exhibit detrimental vibrations during their operation. These vibrations can be classified into two types: (1) self excited vibration known as "chatter"; and (2) free vibration of the cutting tool due to a discontinuous cutting force being exerted on the cutting tool, such as in the case of an interrupted cut. Both types of vibration commonly lead to undesirable cutting performances such as poor workpiece surface finish and out of tolerance finished workpieces. Additionally, the cutting tools and the machines can become damaged due to the undesirable vibrations.

The overall machining system is a dynamic system of which multiple modes of vibration are involved in its operation. These multiple modes of vibration can be classified by their dynamic stiffness. The dynamic stiffness of a machining system is a measure of the machining system's resistance to deformation and the amount of damping in that particular mode of deformation. In the machining arts, the most dynamically flexible mode will dominate the performance of the machining system.

In situations susceptible to chatter, the dynamic stiffness of the most flexible mode determines the limit of stability for the overall system. In the chatter susceptible system, the limit of stability is the largest cut depth that can be obtained without the system becoming unstable and beginning to chatter. However, in the free vibration situation, the most dynamically flexible mode acts to contribute the majority of the uncontrolled displacement in the cutting tool position. This uncontrolled displacement is the dominant contributor to surface irregularities that occur in free vibration situations.

Certain machining system configurations typically exhibit a dominant mode of vibration. This dominant mode of vibration is significantly more flexible than the other modes of vibration associated with the particular system. This is commonly the case with long overhanging tools (tools with a high length to diameter ratio) such as boring bars, long end mills, modular tools and tool extensions. Further, these tools are often used in situations that are susceptible to vibration problems occurring due to interrupted boring, like what would be experienced when boring the cylinder of a two cycle internal combustion engine. In such cases, the overall performance of the machining system can be greatly enhanced by increasing the dynamic stiffness of the dominant mode of vibration.

There are several techniques for increasing the dynamic stiffness of a machining system as taught in the prior art. The aspect ratio of an over hanging tool may be reduced. That is, the length-to-diameter ratio may be reduced, but this option is not always possible due to the geometry of the cut required. The body of the tool may be made of a stiffer material such as tungsten carbide or some other heavy metal. In addition, a dynamic vibration absorber may be added to the system, with or without the application of the above mentioned remedies.

A complete discussion of dynamic vibration absorbers can be found in chapter 6 of the textbook entitled, "Shock And Vibration Handbook", authored by Cyril M. Harris and Charles E. Crede and published by McGraw-Hill Book Company (1961), the disclosure of which is hereby incorporated by reference herein. A dynamic vibration absorber can be tuned so as to vibrate at a desired frequency as is taught in U.S. Pat. Nos. 3,838,936 and 4,553,884. Further, a dynamic vibration absorber may be designed and tuned to reduce the minimum dynamic stiffness of which a machining system will operate at in order to avoid chatter, as is taught in U.S. Pat. No. 3,643,546.

However, the prior art damping systems have many inadequacies which continue to limit the machining art. The current dynamic vibration absorbers (damping means) that are utilized today in the industry only provide a benefit in forced vibration applications undertaken at a specific excitation frequency and, therefore, do not effectively reduce either free vibration or chatter. It can be shown that the optimum tuning of a damping means is different for each of the individual vibration cases.

In order to optimally suppress free vibration in interrupted cutting, the damping means should be tuned to minimize the absolute value of the "displacement versus force" transfer function for the machining system's most dynamically flexible mode of vibration. While providing maximum resistance to chatter, the vibration damping means should be tuned to minimize the height of the negative peak of the "Real" part of the "displacement versus force" transfer function that is associated with the most dynamically flexible mode of vibration. The "Real" part refers to the displacement that is in-phase with the force.

Further, it must be realized that the machining system and the added damping means aggregate to form a strong overall dynamically dependent system. In other words, the addition of the damping means to the machining system acts to strongly affect the dynamic characteristics of the system. The affect effect is not simply due only to the addition of the damping means to the machining system but also due to the significant mass of the damping means itself relative to the effective modal mass of the machining system (the damping means, however, must be of a relatively large mass to have sufficient damping effect on the machining system). Thus, the machining system and the damping means may not be treated independently. In other words, the damping means cannot be tuned separately apart from the machining system and then added later. The simple addition of a damping means to a machining system will affect the frequency of the modes to be dampened and, therefore, will lead to a non-optimally tuned damping means.

Still further, any modification to the system will strongly affect the optimum tuning of the damping means, for example: the placing of a damped tool in a different machine; the changing of the length of the tool; the changing of the configuration of the damped tool in a modular tooling system; or the placing of the dynamic damping means in a different location in the machining system. In essence, the particular setup of the machining system with the added damping means acts to form a unique configuration which is optimally tuned. The tuned damping means is, therefore, only optimized for that unique configuration.

Additionally, because the machining system and added damping means is highly dependent and the damping means will require periodic retuning, the damping means should be tuned while in position within the machining system. Since some personnel responsible for supervising the tooling or machining operation may not be familiar with structural dynamic tuning, there is a need for the damping means to be easily tunable while in position within the machining system with the use of only simple instructions and little or no prior knowledge of structural dynamic testing and tuning methods.

Therefore, it is an object of this invention to provide improvements which overcome the aforementioned inadequacies of the prior art damping systems and provide an improvement which is a significant contribution to the advancement of the machining art.

Another object of this invention is to provide a tunable damping system having a tunable damping assembly and a tuner assembly which automatically identifies the most dynamically flexible mode of vibration of a machining system having the added damping assembly configured and then procedurally directs the tuning so as to increase the dynamic stiffness of the most dynamically flexible mode.

Another object of this invention is to provide a tunable damping system of which the tuning and operation thereof requires little or no prior knowledge of structural dynamic testing and tuning methods.

Another object of this invention is to provide a tunable damping system whereby the actual tuning is electronically controlled and a user is instructed on how to adjust the damping assembly so as to be optimally tuned in either one or both of the following cases: (1) the case of minimum response due to free vibration, and (2) the case of maximum stability and resistance to chatter.

Another object of this invention is to provide a tunable damping system having a tuning capability and tuning procedure which are insensitive to the location of the tunable damping assembly, the damping assembly's effective modal mass, and the effects caused by varying the configuration of the machining system. The damping assembly thereby being allowed to be placed at any convenient location within the tool, the tool extension, or the tool taper while still allowing sufficient movement of the tool in the vibration mode to enable the tunable damping assembly to operate effectively. The ability to vary the tool configuration, such as in modular tooling, without having to change the tuning procedure is also provided for.

Another object of this invention is to provide a tunable damping system that is conveniently usable in the production environment thereby allowing in situ tuning of the tunable damping assembly by the machine operator or other personnel.

Another object of this invention is to provide a tunable damping system that is to be utilized in or on fixed or rotating tools such as boring bars, end mills, modular tooling, tool extensions, spindles, tool holders or fixed machine structures.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is described by the appended claims with the specific embodiment shown in the attached drawings. For the purposes of summarizing the invention, disclosed is a tunable damping assembly suitable for mounting in a metal cutting tool such as a boring bar, an end mill, a modular tool or a tool extension, and an associated tuner assembly having a prescribed tuning procedure. The tuner assembly is used to control the tuning of the tunable damping assembly by increasing or decreasing the overall dynamic stiffness of the machining system in its most flexible mode of vibration.

The tunable damping assembly is designed such that its damper mass can be removably fixed to the machining system. The natural frequency of the tunable damping assembly alone can be increased to a frequency much greater than the frequency of the machining system's most dynamically flexible mode. The tunable damping assembly can be locked, thereby rendering it ineffective so as to allow determination of the machining system's most dynamically flexible mode of vibration. The most flexible mode of vibration must first be determined in order to allow the proper tuning of the tunable damping assembly.

A tuner assembly is also utilized in the determination of the most flexible mode of vibration and thereafter it directs the tuning of the tunable damping assembly. The tuner assembly consists of vibration sensors, a microprocessor to acquire the data sensed by the vibration sensors and to thereafter process that data so as to identify vibration information needed in order to properly direct the tuning procedure.

The tunable damping assembly is comprised of a damper mass (preferably made of a high density material such as tungsten or other heavy metal) held to the system by elastomeric supports. When mounted inside a tool such as a boring bar or an end mill, the damper mass may conveniently be cylindrical with the elastomeric supports at either end of the mass. Toroidal elastomeric supports may be used with a cylindrical damper mass and generally common O-rings are used of which are easy to replace. When used in a non-rotating application, the damper mass and elastomeric supports may be of any convenient shape.

During the process of tuning the tunable damping assembly, the elastomeric supports are interacted with so as to vary the stiffness of the tunable damping assembly. Stiffening of the tunable damping assembly is accomplished by the compression of the elastomeric supports. Further, the damper mass can be locked in position thereby, in effect, fixing it to the system. This is accomplished by either rigidly clamping the mass to the base system or by sufficiently increasing the stiffness of the elastomeric supports so as to provide an essentially rigid connection.

An important feature of the present invention is that the tunable damping system includes a tunable damping assembly and a tuner assembly of which can automatically identify the most dynamically flexible mode of vibration of a machining system and then procedurally direct the tuning thereof so as to increase the minimum dynamic stiffness of the most dynamically flexible mode in order to reduce vibration in the cutting head.

Another important feature of the present invention is that the tuning of the tunable damping assembly is electronically controlled and a user is instructed on how to adjust the damping assembly so as to be optimally tuned in either one or both of the following cases: (1) the case of minimum response due to free vibration, and (2) the case of maximum stability and resistance to chatter.

Another important feature of the present invention is that the tunable damping assembly has a tuning capability and tuning procedure of which are insensitive to its location on the cutting tool, the damping assembly's effective modal mass, and the effects caused by varying the configuration of the machining system. The tunable damping assembly is thereby allowed to be placed at any convenient location within the tool, the tool extension, or the tool taper while still allowing sufficient movement of the tool in the vibration mode to enable effective operation. The ability to vary the tool configuration, such as in modular tooling, without having to change the tuning procedure is an important feature which is provided for in the present invention.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should be realized by those skilled in the art that such equivalent methods and structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which.

Similar reference numerals refer to similar parts throughout the several figures.

DETAILED DESCRIPTION OF THE INVENTION

Figure 1:
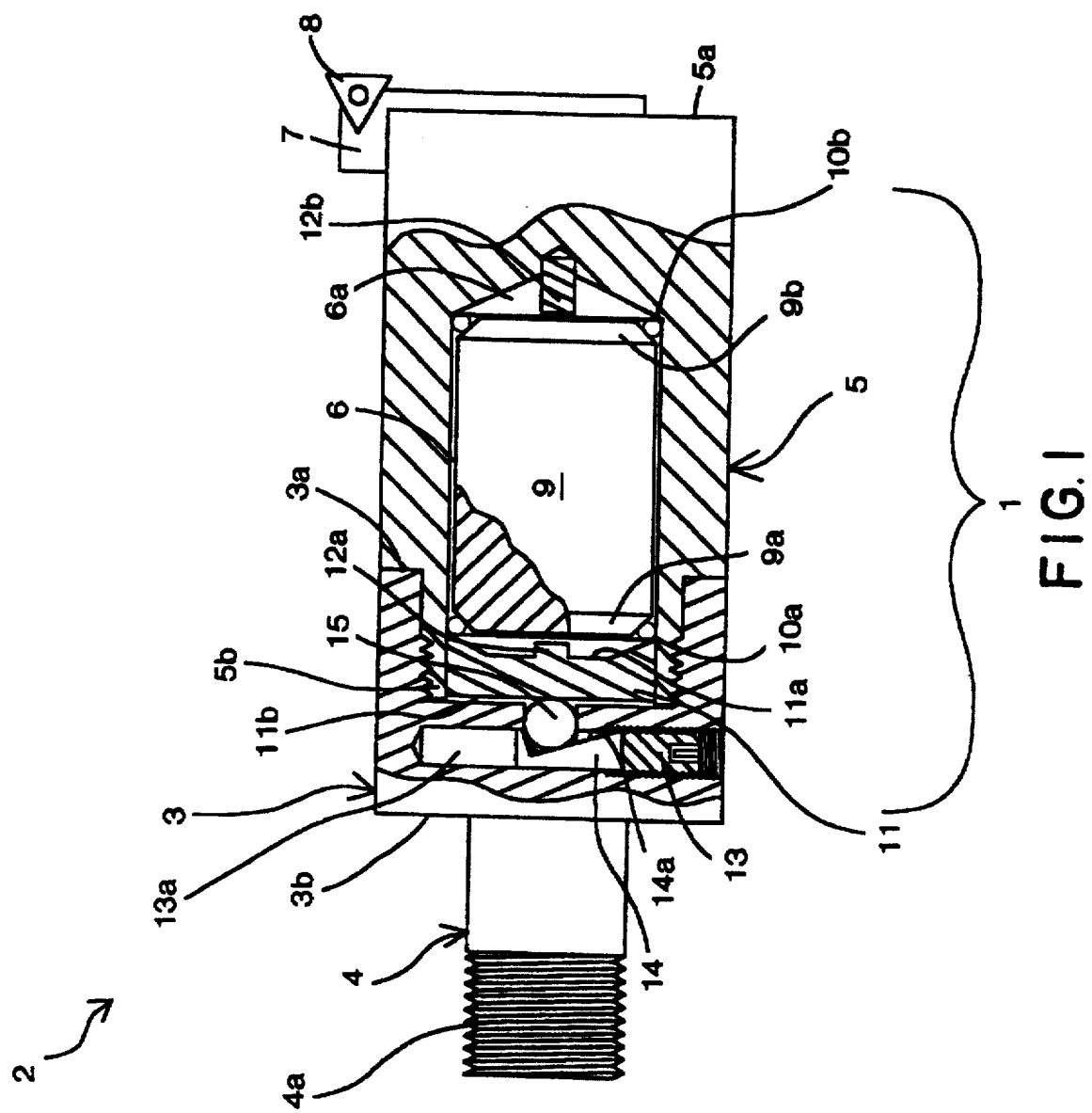
FIG. 1 is a partial cross sectional view of the tunable damping assembly as utilized in a modular tooling head, the damper mass and other various components that form the damping assembly are shown in their relative positions to each other.

In referring to FIG. 1, a partial cross sectional view of the tunable damping assembly 1 of the present invention is shown as utilized in a modular tooling head 2. The modular tooling head 2 includes a first portion 3 having an open internally threaded end 3a and a second end 3b. An integral mounting stud 4 extends centrally outward from the second end 3b of the first portion 3. The mounting stud 4 has external threads 4a to threadingly engage a modular tooling base system.

A second portion 5 having one end 5a and an externally threaded open end 5b is attached to the first portion 3. The second portion 5 is attached by way of the externally threaded open end 5b being threadingly engaged with the open internally threaded end 3a of the first portion 3. A central cavity 6 having a concave closed end 6a is located within the second portion 5. The first portion 3, when engaged with the second portion, acts to enclose the central cavity 6. Additionally, the second portion 5 has a tool holder 7 coupled at its one end 5a of which retains a cutting insert 8.

The tunable damping assembly 1 includes a damper mass 9 having a first and second conical end, 9a and 9b respectively. The damper mass 9 is preferably made of a dense heavy metal material such as tungsten or the like and is generally cylindrical in shape. The damper mass 9 generally has a damper mass to effective system modal mass ratio in the range of 10 to 60 percent. The damper mass 9 is supported at each first and second conical end 9a and 9b by respective first and second elastomeric supports 10a and 10b within the central cavity 6. The first and second elastomeric supports 10a and 10b are preferably in the form of commonly available O-rings. In particular, it is preferred that these O-rings are made of a high damping polymer such as SBR or Viton® rubber. The first and second elastomeric supports 10a and 10b are of a slightly smaller outside diameter than the inside diameter of the central cavity 6 so as to facilitate ease of placement therein.

A sliding jaw 11 having a concave engaging face 11a and a flat planar backside 11b is also contained within the central cavity 6. The first elastomeric support 10a remains interposed between the first conical end 9a of the damper mass 9 and the concave engaging face 11a of the sliding jaw 11. The second elastomeric support 10b remains interposed between the concave closed end 6a of the central cavity 6 and the second conical end 9b of the damper mass 9. The concave engaging face 11a of the sliding jaw 11 and the concave closed end 6a of the central cavity 6 both have included angles that are greater than that of the first and second conical ends 9a and 9b of the damper mass 9. The sliding jaw 11 serves to affect the tuning of the tunable damping assembly 1 by increasing or decreasing the pressure exerted on the first and second elastomeric supports 10a and 10b which results in either stiffening or loosening the damper mass 9 supported therebetween.

This particular configuration provides for the radial compression of the first and second elastomeric supports 10a and 10b by motion of the sliding jaw 11 along the longitudinal axis of the damper mass 9. This configuration also provides for an automatic self-centering action thereby retaining the damper mass 9 in the center of the central cavity 6.

Additionally, the concave engaging face 11a of the sliding jaw 11 and the concave closed end 6a of the central cavity 6 have first and second stop portions 12a and 12b extending centrally outward therefrom respectively. These stop portions 12a and 12b are sized such that the damper mass 9 is rigidly gripped and effectively locked to the base system when the tunable damping assembly 1 is very tightly tuned at a setting in which the first and second elastomeric supports 10a and 10b are greatly compressed.

If additional damping is needed, the central cavity 6 may be partially filled with a dampening fluid that exhibits thermally stable properties and has a high viscosity. The dampening fluid will provide any additional damping that may be needed to supplement that supplied by the first and second elastomeric supports 10a and 10b. Partially filling the central cavity 6 serves to decrease the central cavity 6 volume as would be the case when the first and second elastomeric supports 10a and 10b are compressed.

The tuning of the tunable damping assembly 1 is affected by motion of the sliding jaw 11 along the longitudinal axis of the damper mass 9. The sliding motion is resultingly produced by a tuning screw 13 that is threadingly engaged with a side bore 13a in the first portion 3. The tuning screw 13, when adjusted by turning clockwise or counterclockwise, exerts a force on a tuning cam 14 of which is slidably positioned in the side bore 13a. The tuning cam 14 is generally cylindrical in shape and has a wedge portion 14a thereon. This tuning cam 14, in turn, exerts a force on a push ball 15 that resultingly moves through a central hole 15a located in the open internally threaded end 3a of the first portion 3. The push ball 15 is in constant contact with the wedge portion 14a thereby moving in cooperation therewith. The push ball 15 is simultaneously in contact with the flat planar backside 11b of the sliding jaw 11. Thus, the sliding jaw 11 resultingly moves along the longitudinal axis of the damper mass 9 in response to the tuning screw 13 being adjusted.

Figure 2:
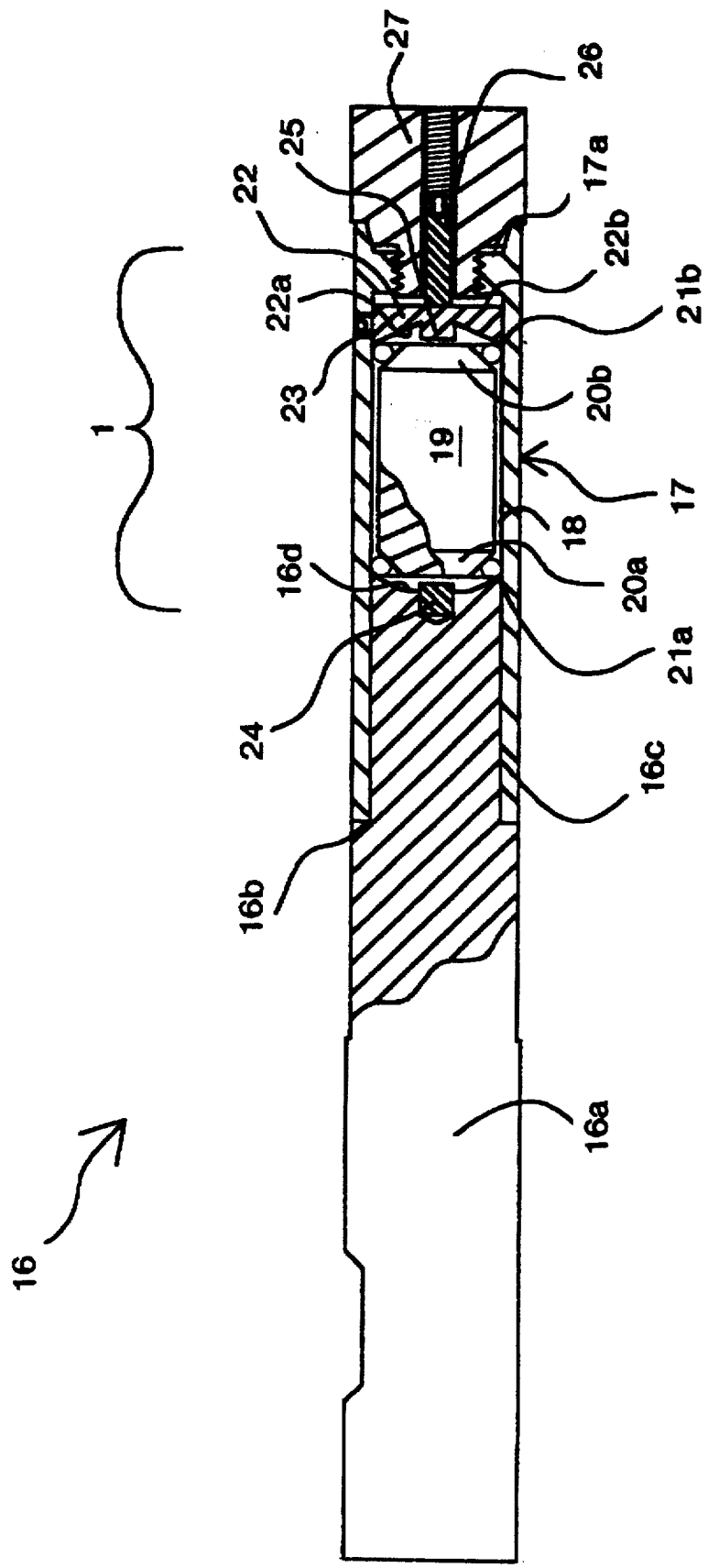
FIG. 2 is a partial cross sectional view of the tunable damping assembly as utilized in an end mill, the damper mass and other various components that form the damping assembly are shown in their relative positions to each other.

Now, in referring to FIG. 2, an alternate embodiment of the tunable damping assembly 1 is shown as utilized in an end mill 16. The end mill 16 includes a shank portion 16a having one end 16b. The end mill 16 is preferably made of a stiff metallic material such as tungsten carbide or the like. A reduced diameter portion 16c is integral with and extending outward from the one end 16b of the shank portion 16a. The reduced diameter portion 16c includes a concave end 16d of which is opposite the shank portion 16a. A cylindrical hollow portion 17, having an inside diameter slightly larger than the outside diameter of the reduced diameter portion 16c, is press fitted thereover. The addition of an epoxy structural adhesive can be added if necessary. The cylindrical hollow portion 17 includes an internally threaded open end 17a. The cylindrical hollow portion 17 in combination with the concave end 16d of the reduced diameter portion 16c defines a damper cavity 18.

The defined damper cavity 18 contains a damper mass 19 of which is preferably made of a dense heavy metal material such as tungsten or the like. The damper mass 19 is generally cylindrical in shape having first and second conical ends, 20a and 20b respectively. The damper mass 19 is supported in the damper cavity 18 by first and second elastomeric supports 21a and 21b at the first and second conical ends 20a and 20b respectively. The first elastomeric support 21a is interposed between the first conical end 20a of the damper mass 19 and the concave end 16d of the reduced diameter portion 16c. A sliding jaw 22 having a concave engaging surface 22a and a flat planar backside 22b traps the second elastomeric support 21b up against the second conical end 20b of the damper mass 19. The concave engaging surface 22a of the sliding jaw 22 remains in contact with the second elastomeric support 21b. The first and second elastomeric supports 21a and 21b are preferably in the form of commonly available O-rings made from a highly damped polymer such as SBR or Viton® rubber. Similarly as in the first embodiment this configuration also provides for the radial compression of the first and second elastomeric supports 21a and 21b by motion of the end mill sliding jaw 22 along the longitudinal axis of the damper mass 19. In addition, this configuration also provides for an automatic self-centering action which thereby retains the damper mass 19 in the center of the damper cavity 18.

The sliding jaw 22 is positioned within the damper cavity 18 and is utilized to effectuate the tuning of the tunable damping assembly 1. In this embodiment of the end mill 16, the sliding jaw 22 is secured in position by a clamping means after being tuned. This clamping means is most preferably supplied by a clamp screw 23 of which is threaded through the cylindrical hollow portion 17 adjacent the sliding jaw 22. The clamping screw 23 contacts the sliding jaw 22 and is tightened to secure the sliding jaw 22 within the damper cavity 18 thereby preventing the sliding jaw 22 from moving.

As a means for locking the damper mass 19 to the base system and thereby disabling the tunable damping assembly 1 so as to determine the most dynamically flexible mode of vibration, the concave engaging surface 22a of the sliding jaw 22 and the concave end 16d of the reduced diameter portion 16c have respective first and second stop portions 24 and 25 of which serve to grip the damper mass 19 upon very tight tuning. The first end second stop portions 24 and 25 extend centrally, outward from the concave end 16d of the reduced diameter portion 16c and the concave engaging surface 22a of the sliding jaw 22 respectively. These first and second stop portions 24 and 25 are sized such that at a very tight tuning of the tunable damping assembly 1 the damper mass 19 is effectively rigidly clamped to the base system.

If additional damping is needed, the damper cavity 18 containing the damper mass 19 may be partially filled with a dampening fluid that exhibits thermally stable properties and has a high viscosity. The dampening fluid will provide any additional damping that may be needed to supplement that supplied by the first and second elastomeric supports 21a and 21b. Partially filling the damper cavity 18 serves to decrease the damper cavity 18 volume as would be the case when the first and second elastomeric supports 21a and 21b are compressed. The tuning of the tunable damping assembly 1 is effectuated by movement of the sliding jaw 22 along the longitudinal axis of the damper mass 19. This movement is produced by a tuning screw 26 that is threaded axially through a removable tuning mixture 27. The tuning fixture 27 is threadingly coupled with the internally threaded open end 17a of the cylindrical hollow portion 17 thereby aligning the tuning screw 26 with the sliding jaw 22. The tuning screw 26 moves along the longitudinal axis of the damper mass 19 as it is adjusted during the tuning procedure. The tuning screw 26 remains in contact with the flat planar backside 22b of the sliding jaw 22 until the clamp screw is tightened thereby securing the sliding jaw 22 in a tuned position and the tuning fixture 27 is subsequently removed. The tuning fixture 27 is replaced by a cutting head to perform various cutting tasks. Most preferably the tuning fixture is sized such that its mass is very near to the mass of the cutting head so as to simulate the presence of the cutting head during the tuning process.

Figure 3:
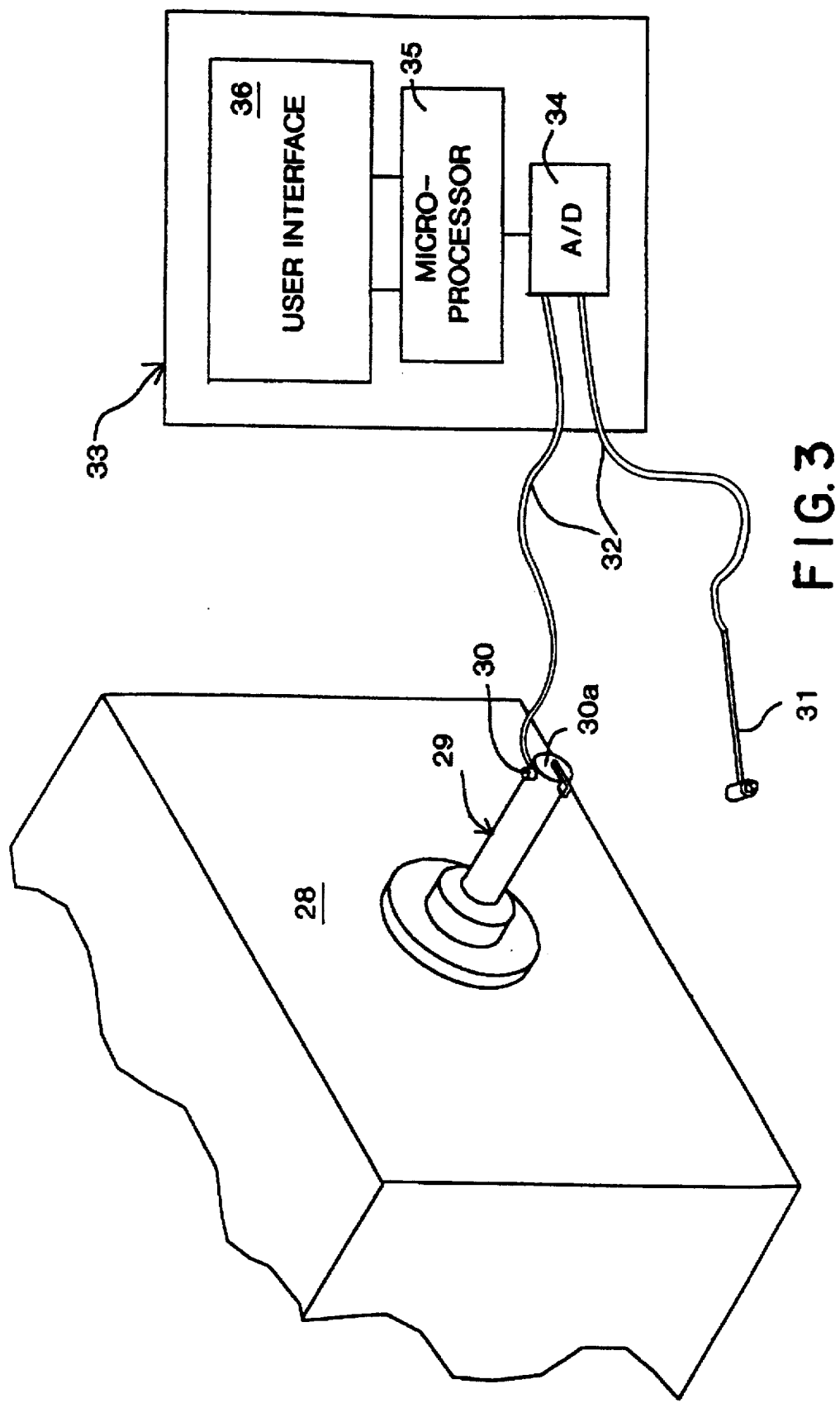
FIG. 3 is a system diagram showing the machine structure, the cutting tool having the damping assembly within, the vibration sensor, the force impact hammer and the tuner assembly in their tuning setup.

In referring to FIG. 3, a system diagram is shown revealing the machine structure 28, a cutting tool 29 having a cutting end 30a, a vibration sensor 30, a force impact hammer 31, a tuner assembly 33 and various cabling 32 in a tuning setup configuration. The cutting tool 29, which contains the tunable damping assembly 1, is mounted on the machine structure 28. Next, a vibration sensor 30 is attached to the cutting tool 29 near the cutting end 30a so as to sense the vibrational motion of the cutting tool 29. This vibration sensor 30 may be in the form of many commonly known sensors such as a piezo crystal based force hammer, a capacitance displacement probe, an inductance/eddy current displacement probe, an optical reflectance probe or an accelerometer. It is most preferred, however, to use an accelerometer.

The vibration sensor 30 can be attached to the cutting tool 29 by the use of screws, adhesives or magnetical means. Alternatively, the vibration sensor 30 may be permanently embedded in the cutting tool 29 and be supplied with removable electrical connections for the cabling 32. The force impact hammer 31 is utilized to supply a force input to the system by way of striking the cutting tool 29 therewith. The vibration sensor 30 and the force impact hammer 31 are connected to the tuner assembly 33 by the cabling 32 and may be preconditioned by signal amplifiers or other appropriate signal processing hardware.

The tuner assembly 33 includes an Analog-to-Digital converter 34 (A/D) so as to convert any sensed signals from their analog form to a digital data form. The manipulation of and calculations with the converted digital data are performed by a microprocessor 35. The tuner assembly 33 may be a dedicated micro-processor based system or may be implemented on a more general purpose system such as a personal computer. The tuner assembly 33 also includes a user interface 36. This user interface 36 enables the operator to communicate an interact with the system. The communications between the operator and the system consist generally of input to the tuner assembly 33 dictating which type of tuning to perform, free vibration or chatter avoidance, and the number of measurements to average which improves the signal to noise ratios in the measurements.

Further, the user interface 36 conveys information to the operator from the tuner assembly 33 such as when the dominant mode of vibration (the most dynamically flexible mode) has been located, and the proper tuning action which is required to be implemented. As such, the user interface 36 includes a means for the operator to input data such as a key pad or a touch sensitive screen, and a means to relay information back to the operator such as a light system or, as preferred, an alpha/numeric display.

The microprocessor 35, is capable of synchronously sampling two sensor signals and performing Fourier Transform mathematical manipulations on those signals. The microprocessor 35 also controls the dynamic mode identification procedures for determining the most dynamically flexible mode of vibration for the system with the cutting tool 29 configured. These manipulations may be done on a hardware type dedicated system or, as preferred, by way of software operating in a more general purpose microprocessor 35.

Figure 4:
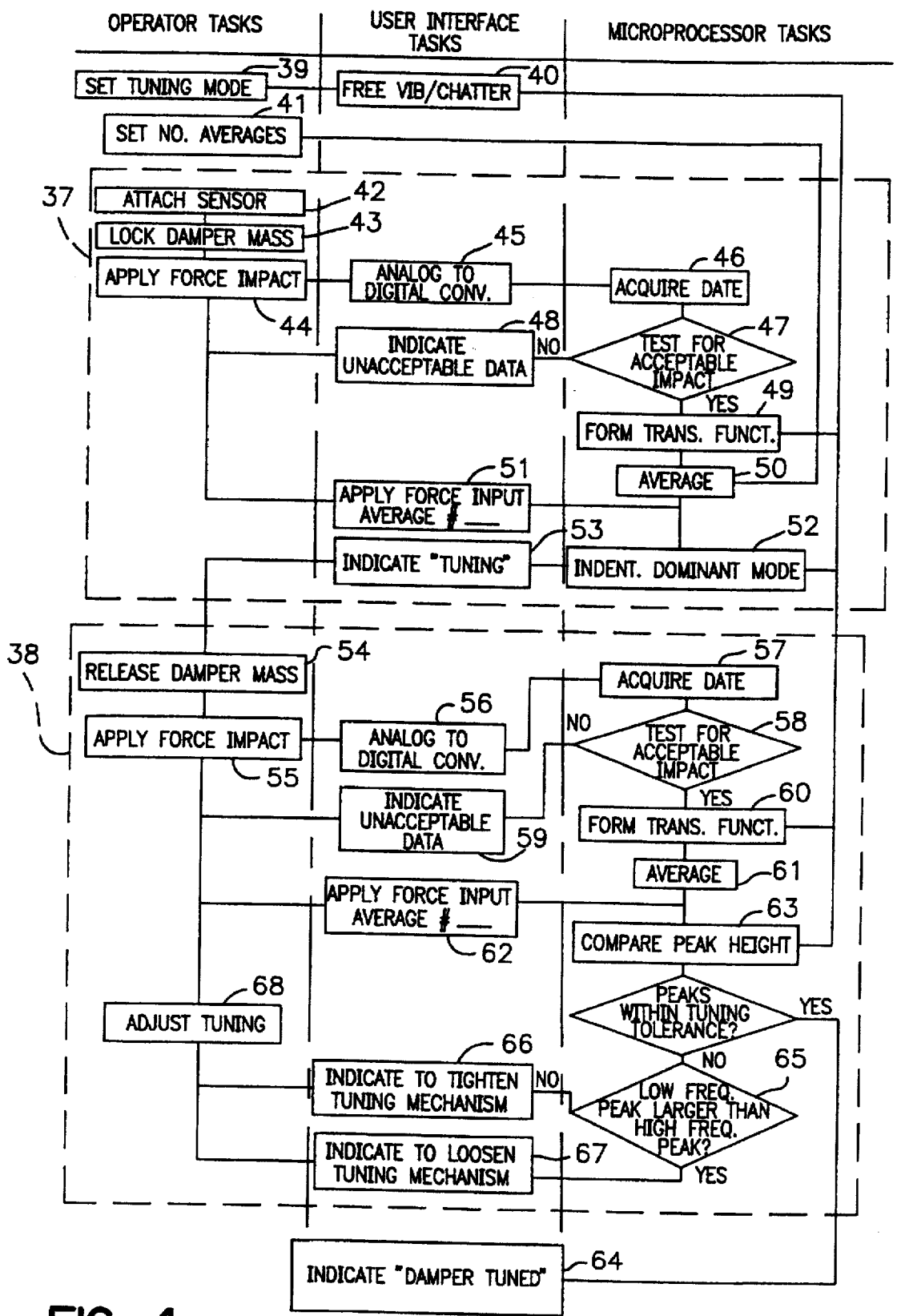
FIG. 4 is a flow chart illustrating the steps performed in the tuning procedure as directed by the tuner assembly.

Referring now to FIG. 4, a flow chart illustrating the steps performed in the tuning procedure as directed by the tuner assembly is shown. The flow chart is subdivided, for clarity, into several different areas. The flow chart is divided vertically into three columns: "operator tasks", "user interface tasks" and "microprocessor tasks". The operator tasks are those actions that must be performed by the operator that is tuning the tunable damping assembly 1. The user interface tasks column lists the communications that take place between the operator, vibration sensors 30 and the tuner assembly 33. The microprocessor task column lists the tasks that are preformed internally in the microprocessor. The flow chart is also subdivided into the dominant mode tasks 37 included in which are those tasks involved in identifying the dominant mode of vibration (the most dynamically flexible mode) of the system and the tuning tasks 38 included in which are those tasks associated with the tuning of the tunable damping assembly to suppress the identified dominant mode of vibration.

In following the flow chart in FIG. 4 along with the discussion that is to follow, the procedure for tuning the tunable damping assembly 1 can be more readily understood. For describing the operation, the end mill 16 will be used. The operator sets the tuning mode, step 39, for either free vibration or chatter avoidance using the user interface 36, step 40. The operator then sees the number of measurements desired to be averaged for noise rejection, step 41. Step 41 may be eliminated by internally setting the microprocessor 35 with the number of measurements desired to be averaged or by setting the microprocessor 35 so as not to average at all. Next, the operator attaches the vibration sensor 30 near the cutting end 30a of the cutting tool 29 while the cutting tool 29 is mounted in the machine structure 28, step 42. The operator then is to lock the damper mass 19 by tuning the tunable damping assembly 1 to its most rigid setting, step 43. This will lock the damper mass 19 between the first and second stop portions 24 and 25 or simply compress the first and second elastomeric supports 21a and 21b sufficiently to force the vibration mode of the tunable damping assembly 1 to a frequency much higher than that of the dominant mode of vibration of the system.

With the damper mass 19 now locked, the operator is to provide an excitation force to the cutting tool 29 by striking the cutting tool 29 near its cutting end 30a with the force impact hammer 31, step 44. The vibrations now present in the cutting tool 29, caused by the excitation force and sensed by the vibration sensor 30, are thereby transformed into corresponding analog signals and then converted to digital data, step 45. The digital data is then recorded by the microprocessor 35, step 46. Preferably the signals are sampled simultaneously and the sampling is triggered from the input of the force impact hammer 31. The microprocessor 35 then tests the recorded data for acceptability, step 47.

Testing for acceptability can be done using several different methods such as evaluating the time domain signal representing the force impact hammer's 31 impact with the cutting tool 29 so as to see if there was a multiple impact or, most preferably, by examining the sensed vibrational response of the cutting tool 29 in the frequency domain and verifying that there is sufficient spectral content at all frequencies of interest. If the recorded data is determined to be unacceptable the user interface 36 will indicate to the operator that a reapplication of the excitation force is required, step 48. If the recorded data is determined to be acceptable, the transfer function of the vibrational displacement-vs-impact force is evaluated, step 49.

This transfer function can be in terms of acceleration, velocity or displacement. Any of these forms can be readily converted mathematically to the other. The evaluation is most preferably carried out by way of a Fourier Transform analysis conducted on the impact force, as was generated by the force impact hammer 31 when impacting with the cutting tool 29, and the vibration response, as sensed by the vibration sensor 30. After conducting a Fourier Transform analysis on the impact force and the vibration response, their ratio is then formed.

Whichever form the transfer function is to be evaluated in, Real or Magnitude, will be determined by the desired vibrational condition for which the system is being tuned for, either free vibration or chatter. If averaging has been chosen, the microprocessor 35 calculates the average of the present transfer function combined with any previously calculated transfer functions, step 50. The number of measurements averaged is then compared to the number selected. If the number of averaged signals is less than the specified number to be averaged, the operator is directed to reapply an excitation force and is notified of the present averaging number, step 51. This procedure is repeated until the selected number of averages has been attained. The microprocessor 35 then uses dynamic mode evaluation techniques and algorithms to determine the most dynamically flexible mode of vibration, step 52. This most dynamically flexible mode of vibration is resultingly in the form of a complex frequency based transfer function of the locked system.

When the most dynamically flexible mode of vibration has been determined, the user interface 36 indicates to the operator that the tuning procedure may begin, step 53. The tuning procedure begins by the operator releasing the damper mass 19 from the locked position, step 54. The operator then reapplies the excitation force to the cutting tool 29, step 55. The sensed vibrational response data is then converted to a digital form, step 56, and the digital data is recorded by the microprocessor 35, step 57. The acceptability of the data is determined in a similar fashion as discussed previously above, step 58.

The operator is then either prompted to reapply the excitation force, step 59, or the data has been determined to be acceptable and the transfer function is formed an accordance with the desired vibrational condition for which the system is being tuned for, step 60. Next, the transfer function is averaged based on the number of averages chosen, step 61, and the procedure is repeated until the chosen number of averages has been attained, step 62. The microprocessor 35 then compares the peak heights of the transfer function in the area of the most dynamically flexible mode of vibration to determine what specific tuning action is required to be implemented, step 63.

The particular manner in which the peak heights are compared is dictated by the vibrational condition for which the system is being tuned for. If the peaks heights are not initially within the proper tuning tolerance as dictated by the vibrational condition for which the system is being tuned for, the peak heights are compared to one another and the microprocessor 35 directs the tuning accordingly, step 65. In directing the tuning adjustments, the microprocessor 35 directs the operator to tighten the tuning screw 26 if the higher frequency peak is dominant, step 66. If the lower frequency peak is dominant, the operator is directed to loosen the tuning screw 26, step 67. The operator then implements the tuning action as directed by the microprocessor 35 in the tuner assembly 33, step 68. These adjustment procedures are iterated until the tunable damping assembly is optimally tuned within the proper tuning tolerance.

When observing a vibrational response in a graphical type of format, it is typical to observe a single mode of vibration that is significantly more flexible than others (basically all those systems where the application of a tunable damping assembly 1 is justified) since the system is behaving like a single degree of freedom system. However, with a tunable damping assembly 1 applied having the damper mass 19 enabled, the system will exhibit the response of a two degree of freedom vibrational system. Thus for the case of free vibration, the peak of the absolute value of the complex displacement versus force transfer function in the area of the mode of maximum dynamic flexibility will be split into two peaks. When the tunable damping assembly 1 is optimally tuned, the height of these two peaks will be equal. In addition, when the tunable damping assembly 1 is under tuned the height of the lower frequency peak will be less than the height of the higher frequency peak and this pattern is reversed when the tunable damping assembly 1 is over tuned.

For the case of self excited vibration (chatter), the tunable damping assembly 1 is optimally tuned when the height of the negative peak of the real portion of the displacement versus force transfer function is minimized. In order to tune to this condition, the positive real peak due to the second mode of vibration is used to cancel the negative real peak of the first mode of vibration. This also leads to two peaks in the negative real transfer function in the area or the most flexible mode of vibration. When the tunable damping assembly 1 is optimally tuned to suppress self excited vibration, these two negative peaks will have the same height. In addition, when the tunable damping assembly 1 is under tuned the height of the lower frequency peak is less than that of the higher frequency peak and this pattern is reversed for the over tuned case. Hence, the algorithm for tuning the tunable damping assembly 1 may be the same for both tuning modes, except that different data is operated on; in the free vibration mode, the data corresponding to the absolute value of the complex transfer function in the area of the most dynamically flexible mode is used, and in the self excited mode (chatter) the data corresponding to the negative of the real portion of the complex transfer function in the area of the mode with the greatest negative real peak is used.

Figure 5A:
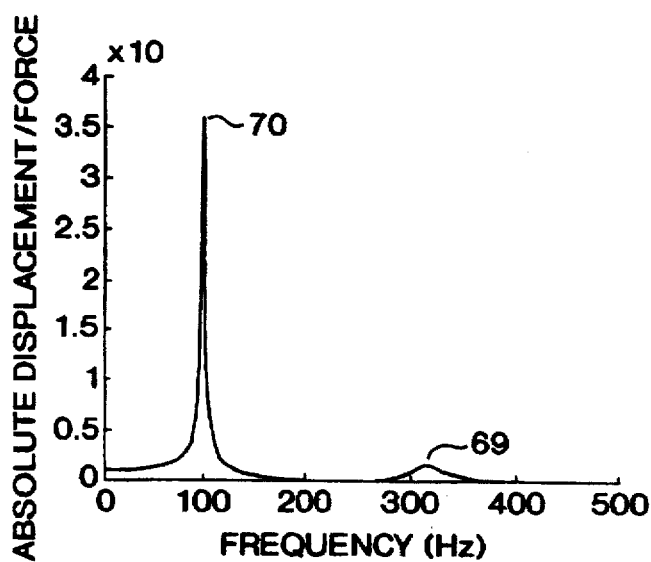
FIG. 5a is a graphical representation of the magnitude transfer function measured in the free vibration mode for a typical system not having a tunable damping assembly.
Figure 5B:
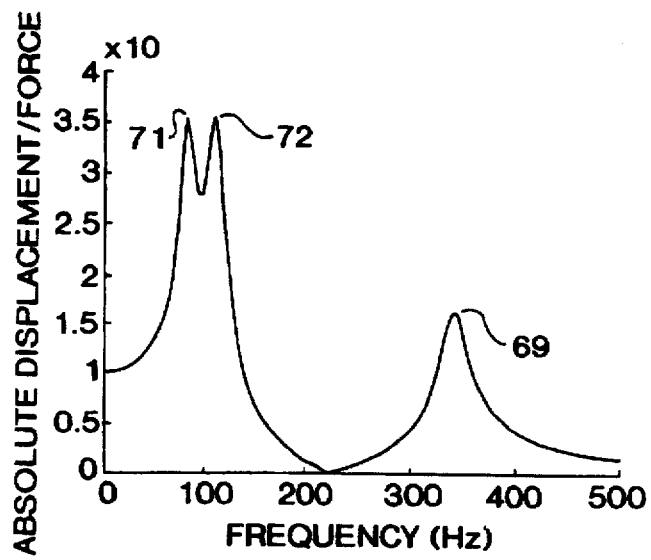
FIGS. 5b and 5c are graphical representations for the same system as measured in FIG. 5a after having added an optimally tuned tunable damping assembly.
Figure 5C:
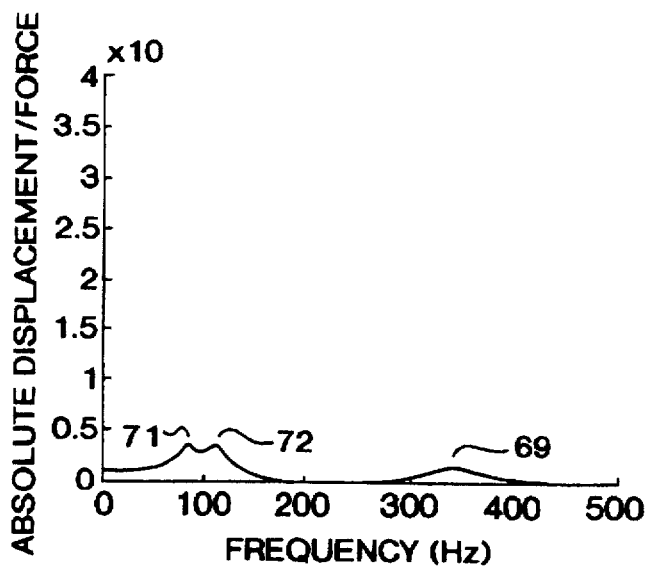

In now referring to FIGS. 5a, 5b and 5c, the respective graphical representations of the magnitude transfer function measured in the free vibration mode are illustrated for a typical system not having a tunable damping assembly 1 and for the same system after having added an optimally tuned tunable damping. FIG. 5a shows the magnitude transfer function of a typical system exhibiting two distinct modes of vibration. A secondary mode 69 is located at approximately 320 Hertz and a dominant mode 70 is located at approximately 100 Hertz. The peak heights of the magnitude transfer function at each of these secondary and dominant modes 69 and 70 are an indication of the flexibility in that particular mode. In FIG. 5b, the addition of an optimally tuned tunable damping assembly 1 to the system can be seen to have divided the dominant mode 70 into a first and second mode 71 and 72 in accord with a two degree of freedom system.

FIG. 5c shows the magnitude transfer function of the same system on a larger scale after having optimally tuned the tunable damping assembly 1 by the aforementioned procedure to reduce the free vibration response. The resultant first and second modes 71 and 72 have been tuned to have approximately the same dynamic stiffness, i.e., the same peak height.

Figure 6A:
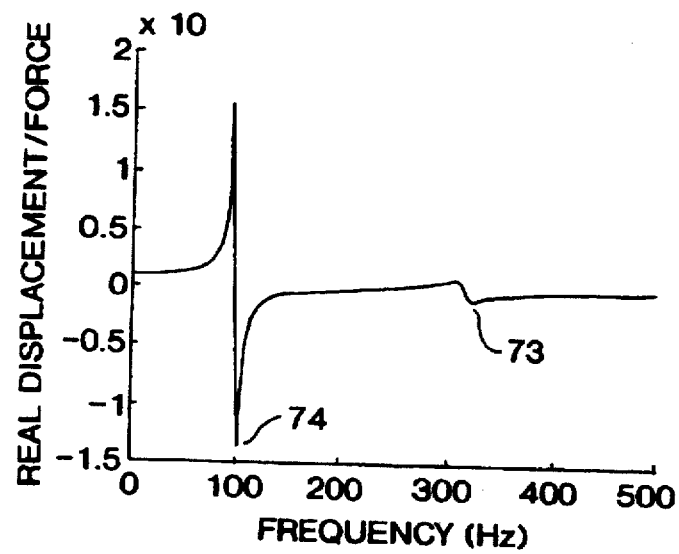
FIG. 6a is a graphical representation of the Real transfer function of a typical system as measured in the self excitation mode (chatter mode) while not having any tunable damping assembly incorporated therewith.
Figure 6B:
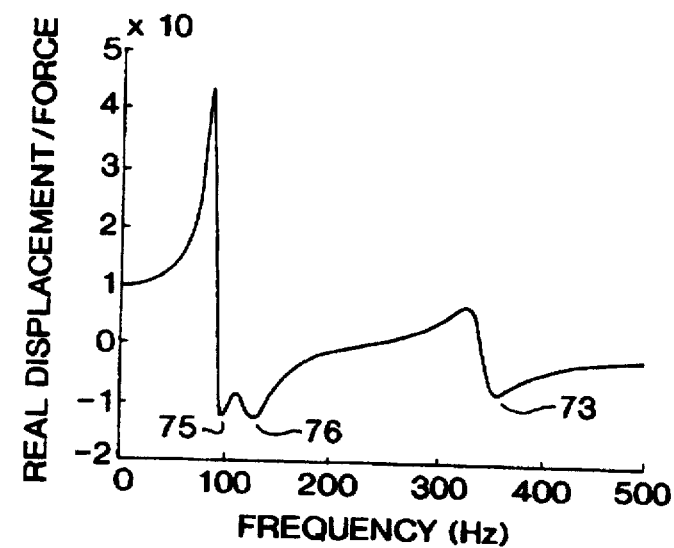
FIGS. 6b and 6c are graphical representations of the same system as measured in FIG. 6a after having an optimally tuned tunable damping assembly incorporated therewith.
Figure 6C:
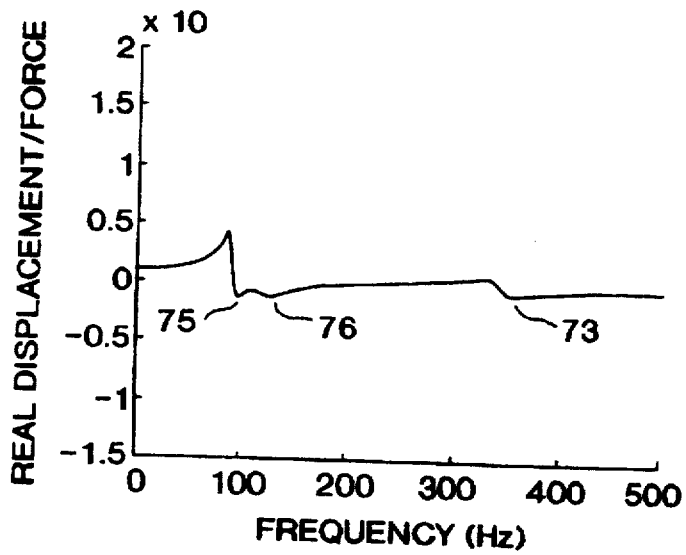

In now referring to FIGS. 6a, 6b and 6c, the respective graphical representations of the Real transfer function of a typical system can be seen as measured in the self excitation mode (chatter mode) while not having any tunable damping assembly 1 incorporated therewith and for the same system having an optimally tuned tunable damping assembly 1 incorporated therewith. FIG. 6a shows the Real transfer function of the system having a secondary mode 73 near 320 Hertz and a dominant mode 74 near 100 Hertz. In FIG. 6b, the Real transfer function of the same system shows the effects of the added optimally tuned tunable damping assembly 1 where the dominant mode 74 has been divided into a first and second dominant mode peak 75 and 76.

FIG. 6c shows the Real transfer function of the same optimally tuned system on a larger scale by the aforementioned procedure to increase the systems resistance to chatter. The tunable damping assembly 1 has served to reduce the height of the maximum negative real portion of the transfer function, yielding the two dominant mode peaks 75 and 76 of which, after tuning, are adjusted to be approximately the same magnitude so as to achieve a maximum system resistance to chatter.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. A tunable damping system for use in machining apparatus, said tunable system comprising:
    a) a cutting tool holder assembly including a damper mass and an adjustable mount resiliently supporting said damper mass;
    b) a tuning device for adjusting the resilience of said supporting mount;
    c) a lock for temporarily locking said damper mass to facilitate the determination of damping mode parameters; and
    d) a tuner aid assembly including a a microprocessor, an A/D converter electrically coupled to said microprocessor, a vibration sensor mounted on said cutting tool holder assembly, said sensor being electrically coupled to said A/D converter, and an impact device for vibrating said cutting tool holder assembly, said impact device being electrically coupled to said A/D converter, and programming means;
    e) said programming means causing said microprocessor to evaluate the relationship between the force delivered to said cutting tool holder by said impact device and the signals from the A/D converter representing the vibrations of said cutting tool holder caused by said impact device when said damper mass is locked, and based on that evaluation to determine the most dynamically flexible mode of vibration of said cutting tool assembly;
    f) said programming means further causing said microprocessor to evaluate the relationship between the force delivered to said cutting tool holder by said impact device and the signals from the A/D converter representing the vibrations of said cutting tool holder caused by said impact device when said damper mass is unlocked, and based on both said evaluations to determine what corrective adjustment of said tuning device is required to minimize vibration of said cutting tool holder assembly, whereby said tuner assembly facilitates the control of the tuning procedure.

2. The tunable damping system as recited in claim 1, wherein said tuning device comprises a sliding member.

3. The tunable damping system as recited in claim 2, wherein said tuning device further comprises a tuning screw, a tuning cam positioned in slidable contact with said tuning screw, and a push ball interposed between and in constant contact with said tuning cam and said sliding member, whereby said tuning screw exerts a force upon said tuning cam which transfers the force to said push ball which facilitates the movement of said sliding member in cooperation therewith thereby adjusting the resilience of said supporting mount.

4. The tunable damping system as recited in claim 2, wherein said tuning device comprises a tuning fixture removably coupled to said damping assembly, said tuning fixture having a tuning screw threadingly engaged therethrough, whereby said tuning screw is positioned to contact said sliding member and thereby facilitate the movement of said sliding member so as to facilitate the adjustment of the resilience of said supporting mount.

5. The tunable damping system as recited in claim 3, wherein said supporting mount comprises at least one O-ring.

6. The tunable damping system as recited in claim 5, wherein said damper mass is formed from a high-density metal.

7. The tunable damping system as recited in claim 6, wherein said damper system has a damper mass to effective system mass ratio in the range of about 10 to about 60 percent.

8. The tunable damping system as recited in claim 7, wherein said damper system comprises a cavity which is at least partially filled with a high viscosity oil having relatively constant thermal properties over system operating temperatures.

9. The tunable damping system as recited in claim 2, wherein said lock comprises first and second stop portions extending outward from said sliding member and said cavity, whereby said first and second stop portions rigidly grip said damper mass therebetween upon said supporting mount being compressed to a maximum.

10. The tunable damping system of claim 1 wherein said vibration sensor is an accelerometer.

11. A tunable damping system as in claim 1 wherein said tuner aid assembly further comprises a user interface, and said programming means causes said microprocessor to relay said corrective adjustment to said user interface whereby a user is advised thereof.

12. A tunable damping system as in claim 1 wherein said programming means presents to said user interface a choice between at least two forms of vibration to be tuned, and said user interface includes means for a user to select one of said choices, and said programming means causes said microprocessor to determine different corrective adjustments depending upon which choice is made.

13. A method for tuning a tunable damping system comprising the steps of:
    a) selecting a form of vibration;
    b) locking a damper mass;
    c) determining a the most flexible mode of vibration within the chosen form of vibration;
    d) unlocking said damper mass;
    e) recording vibrational response measurements in the form of a transfer function versus frequency to locate dominant mode peaks; and
    f) adjusting a tuning device so as to make dominant mode peak heights equal in order to obtain an optimum tuning for the selected form of vibration.

14. The method for tuning a tunable damping system as recited in claim 13, wherein the adjusting of said tuning device further comprises the step of comparing the most flexible mode of vibration with preset tuning tolerance limits.

15. A tuner aid assembly including a microprocessor, an A/D converter electrically coupled to said microprocessor, a vibration sensor adapted to be mounted on a cutting tool holder assembly, said sensor being electrically coupled to said A/D converter, and an impact device for vibrating said cutting tool holder assembly, said impact device being electrically coupled to said A/D converter, and programming means;

said programming means causing said microprocessor to evaluate the relationship between the force delivered to said cutting tool holder by said impact device and the signals from the A/D converter representing the vibrations of said cutting tool holder caused by said impact device when said damper mass is locked, and based on that evaluation to determine the most dynamically flexible mode of vibration of said cutting tool assembly;

said programming means further causing said microprocessor to evaluate the relationship between the force delivered to said cutting tool holder by said impact device and the signals from the A/D converter representing the vibrations of said cutting tool holder caused by said impact device when said damper mass is unlocked, and based on both said evaluations to determine what corrective tuning adjustment is required to minimize vibration of said cutting tool holder assembly, whereby said tuner assembly facilitates the control of a cutting tool tuning procedure.

16. A tuner aid assembly as in claim 15 further comprising a user interface, and wherein said programming means causes said microprocessor to relay said corrective adjustment to said user interface whereby a user is advised thereof.

17. A tuner aid assembly as in claim 16 wherein said programming means presents to said user interface a choice between at least two forms of vibration to be tuned, and said user interface includes means for a user to select one of said choices, and said programming means causes said microprocessor to determine different corrective adjustments depending upon which choice is made.

18. A tuner aid assembly as in claim 16 wherein said programming means causes said microprocessor to perform the following steps in determining said corrective adjustment for a tunable damping assembly including a lockable and unlockable damper mass:

instructing a user, via said user interface, to lock said damper mass;

determining the most flexible mode of vibration of said tunable damping assembly;

instructing said user, via said user interface, to unlock said damper mass;

recording vibrational response measurements in the form of a transfer function versus frequency to locate dominant mode peaks; and instructing said user, via said user interface, to adjust said tunable damping assembly so as to make dominant mode peak heights equal in order to obtain an optimum tuning.

19. A tuner aid assembly as in claim 17 wherein said programming means causes said microprocessor to perform the following steps in determining said corrective adjustment for a tunable damping assembly including a lockable and unlockable damper mass and having at least two different modes of vibration:

instructing a user, via said user interface, to select one of said forms of vibration for which to tune said assembly;

instructing said user, via said user interface, to lock said damper mass;

determining the most flexible mode of vibration of said tunable damping assembly in the selected form of vibration;

instructing said user, via said user interface, to unlock said damper mass;

recording vibrational response measurements in the form of a transfer function versus frequency to locate dominant mode peaks; and instructing said user, via said user interface, to adjust said tunable damping assembly so as to make dominant mode peak heights equal in order to obtain an optimum tuning for the selected vibration mode.

20. A tuner aid assembly as in claim 19 wherein said two different selectable forms of vibration are free vibration and self-excited vibration.

* * * * *